US007058802B1

(12) United States Patent
Epstein et al.

(10) Patent No.: US 7,058,802 B1
(45) Date of Patent: Jun. 6, 2006

(54) COMMUNICATION MANAGEMENT SYSTEM

(75) Inventors: Steve Epstein, Jerusalem (IL); Tzvi Tabakman, Jerusalem (IL); Steven Simkin, Jerusalem (IL)

(73) Assignee: NDS, Ltd., Middlesex (GB)

( * ) Notice: Subject to any disclaimer, the term of this patent is extended or adjusted under 35 U.S.C. 154(b) by 905 days.

(21) Appl. No.: 09/721,053

(22) Filed: Nov. 22, 2000

(30) Foreign Application Priority Data

Dec. 27, 1999 (IL) ........................................ 133753

(51) Int. Cl.
*H04L 9/00* (2006.01)

(52) U.S. Cl. ..................... 713/150; 725/111; 726/26; 726/27; 705/51; 705/57

(58) Field of Classification Search ................ 713/201, 713/150, 151; 725/111; 705/51, 57; 726/26, 726/27
See application file for complete search history.

(56) References Cited

U.S. PATENT DOCUMENTS

| 5,161,193 | A | * | 11/1992 | Lampson et al. ........... 713/151 |
| 5,282,249 | A | | 1/1994 | Cohen et al. |
| 5,481,609 | A | | 1/1996 | Cohen et al. |
| 6,212,563 | B1 | * | 4/2001 | Beser ..................... 709/227 |
| 6,393,562 | B1 | * | 5/2002 | Maillard ................. 713/150 |
| 6,473,858 | B1 | * | 10/2002 | Shimomura et al. ........ 713/150 |
| 6,553,568 | B1 | * | 4/2003 | Fijolek et al. ............. 725/111 |

FOREIGN PATENT DOCUMENTS

| JP | 10-93547 | 9/1996 |
| WO | PCT/IL00/00103 | 2/2000 |

OTHER PUBLICATIONS

"ATSC Data Broadcast Specification-DRAFT ATSC Standard", revised Jan. 11, 1999.
"Implementation Guidelines fot Databroadcasting", SI-DAT 382 Rev. 3, Jun. 18, 1997.
"Digital Video Broadcasting (DVB); DVB Specification for Data Broadcasting", TS 101 192 V1.1.1 (Oct. 1997) Technical Specification by the European Telecommunications Standards Institute (ETSI).
English Translation of a publication entitle "Access Control System for the MAC/Packet Family; Eurocrypt", Mar. 1989.
"Teaching IP new tricks: VLANS, Qos, and Other Advanced LAN Protocols", Lee Goldberg, *Electronic Design Magazine*, Sep. 1, 1998.

* cited by examiner

*Primary Examiner*—Matthew Smithers
*Assistant Examiner*—Paul E. Callahan
(74) *Attorney, Agent, or Firm*—Welsh & Katz, Ltd.

(57) ABSTRACT

A communication session management method for providing a transmission service having a plurality of service-levels, each service-level being associated with a separate quality-of-service (QOS), the method including preparing data for transmission at one of the plurality of service-levels by uniquely associating a service-level encryption key with the one of the plurality of service-levels, encrypting the data with the service-level encryption key to form encrypted data uniquely associated with the one of the plurality of service-levels, and transmitting the encrypted data uniquely associated with the one of the plurality of service-levels to users entitled to the one of the plurality of service-levels.

19 Claims, 3 Drawing Sheets

COMMUNICATION MANAGEMENT SYSTEM

FIELD OF THE INVENTION

The present invention relates to data communication systems generally and more particularly to management of data transmitted via communication systems such as satellite communication systems.

BACKGROUND OF THE INVENTION

Satellite communication is rapidly growing today as an alternative to communication via terrestrial communication systems. The rapid growth of the Internet network as well as requirements for a variety of broadcast television channels led to development of applications of data broadcasting and digital video broadcasting via satellite. However, development of various issues related to satellite communication, such as ensuring a reliable quality of service for different users of on-demand unicast broadcasting services, is still required. It is appreciated that the problems of satellite communication are not limited to communication via satellite only, and that satellite communication is used throughout the present specification and claims by way of example only.

Continued efforts to standardize data broadcasting and digital video broadcasting has resulted in current standards that are found in the following publications:

a publication entitled "ATSC Data Broadcast Specification—DRAFT ATSC Standard" revised Jan. 11, 1999;

a publication entitled "Implementation Guidelines for Databroadcasting", SI-DAT 382 Rev. 3, dated Jun. 18, 1997; and a publication entitled "Digital Video Broadcasting (DVB); DVB specification for data broadcasting", TS 101 192 V1.1.1 (1997-10) Technical Specification by the European Telecommunications Standards Institute (ETSI).

An aspect of the efforts to ensure a reliable quality of service to users is mentioned in unpublished Israel patent application 129,230 which describes a system for determining that all of a scrambled message has been successfully received.

An access control system for broadcasting services is described in an English translation of a publication entitled "Access control system for the MAC/packet family: Eurocrpyt", dated March 1989. Additional access control systems for broadcasting services are described in U.S. Pat. Nos. 5,282,249 and 5,481,609 to Cohen et al.

Quality of service in packet networks is described in an article entitled "Teaching IP new tricks: VLANs, QoS, And Other Advanced LAN Protocols", by Lee Goldberg, in Electronic Design magazine, dated Sep. 1, 1998.

The disclosures of all references mentioned above and throughout the present specification are hereby incorporated herein by reference.

SUMMARY OF THE INVENTION

The present invention seeks to provide an improved method for ensuring a reliable quality of service for different users in a data communication system.

In the present invention, a transmission service having a plurality of service-levels is provided. The plurality of service-levels are hierarchical with a quality-of-service (QOS) hierarchy, and each service-level is preferably associated with a QOS which is determined by at least one parameter that defines service quality. Parameters that define service quality may include, for example, a data transmission bandwidth, a number of concurrent users allowed to connect, a set of transmission applications served, a type of downgrade support to a service-level lower in the QOS hierarchy, a type of disconnect-on-idle operation, a determination of a World Wide Web (Web) server to connect to, or a combination thereof.

The transmission service is preferably provided by a headend to a plurality of users. The users may include individual users connecting, for example, to the Internet, or users of an Intranet. At the headend, data is prepared for transmission at one of the plurality of service-levels by uniquely associating a service-level encryption key with the one of the plurality of service-levels. The data is then encrypted with the service-level encryption key to form encrypted data uniquely associated with the one of the plurality of service-levels. Then, the encrypted data uniquely associated with the one of the plurality of service-levels is transmitted to users entitled to the one of the plurality of service-levels.

Service-level decryption keys are typically separately distributed to the users, by any appropriate means such as by telephone, according to a service-level to which they subscribed. Thus, only users entitled to the one of the plurality of service-levels may decrypt the encrypted data uniquely associated with the one of the plurality of service-levels. It is thus appreciated that service-level encryption protects a quality-of-service and not a downloaded content.

There is thus provided in accordance with a preferred embodiment of the present invention a communication session management method for providing a transmission service having a plurality of service-levels, each service-level being associated with a separate quality-of-service (QOS), the method including preparing data for transmission at one of the plurality of service-levels by uniquely associating a service-level encryption key with the one of the plurality of service-levels, encrypting the data with the service-level encryption key to form encrypted data uniquely associated with the one of the plurality of service-levels, and transmitting the encrypted data uniquely associated with the one of the plurality of service-levels to users entitled to the one of the plurality of service-levels.

Further in accordance with a preferred embodiment of the present invention the method also includes the step of distributing to the users entitled to the one of the plurality of service levels decryption key derivation information for decrypting the encrypted data.

Still further in accordance with a preferred embodiment of the present invention the decryption key derivation information is included in an entitlement control message (ECM).

Additionally in accordance with a preferred embodiment of the present invention the plurality of service-levels are hierarchical according to a QOS hierarchy.

Moreover in accordance with a preferred embodiment of the present invention each one of the plurality of service-levels includes an indication of at least one of the following a data transmission bandwidth, a number of users that may concurrently connect to the transmission service, a set of transmission applications served, a type of downgrade support to a service-level lower in the QOS hierarchy, a type of disconnect-on-idle operation, and a determination of a Web server to connect to.

Further in accordance with a preferred embodiment of the present invention the method also includes the steps of determining that communication load at the at one of the plurality of service-levels exceeds a threshold, and downgrading to an available service-level that is lower in the QOS hierarchy than the one of the plurality of service-levels.

Still further in accordance with a preferred embodiment of the present invention the downgrading step is supported in one of the following modes an automatic mode, and a mode in which downgrade is made upon confirmation of a user.

Additionally in accordance with a preferred embodiment of the present invention the downgrading step includes identifying the available service-level that is lower in the QOS hierarchy than the one of the plurality of service-levels, encrypting the data with an encryption key uniquely associated with the available service-level that is lower in the QOS hierarchy than the one of the plurality of service-levels to form encrypted data uniquely associated with the service-level that is lower in the QOS hierarchy, and transmitting the encrypted data uniquely associated with the service-level that is lower in the QOS hierarchy to users entitled to the one of the plurality of service-levels.

Moreover in accordance with a preferred embodiment of the present invention the transmission service includes at least one of the following: a unicast transmission, and a multicast transmission.

Further in accordance with a preferred embodiment of the present invention the users include at least one of the following: individual users, and users of an Intranet.

Still further in accordance with a preferred embodiment of the present invention the encrypting step is performed in the PID layer.

Additionally in accordance with a preferred embodiment of the present invention the method also includes the step of enabling the users entitled to the one of the plurality of service-levels to decrypt the encrypted data according to service-level entitlements of the users.

Moreover in accordance with a preferred embodiment of the present invention the data includes at least one of the following: any type of computerized data, video information, audio information, and multimedia.

Further in accordance with a preferred embodiment of the present invention the data includes on-demand data.

There is also provided in accordance with another preferred embodiment of the present invention a system at a headend for providing a transmission service having a plurality of service-levels, each service-level being associated with a separate quality-of-service (QOS), the system including a management unit for preparing data for transmission at one of the plurality of service-levels by uniquely associating a service-level encryption key with the one of the plurality of service-levels, an encryptor operatively associated with the management unit and operative to encrypt the data with the service-level encryption key to form encrypted data uniquely associated with the one of the plurality of service-levels, and a transmitter unit operatively associated with the management unit and the encryptor and operative to transmit the encrypted data uniquely associated with the one of the plurality of service-levels to users entitled to the one of the plurality of service-levels.

Further in accordance with a preferred embodiment of the present invention the data includes at least one of the following any type of computerized data, video information, audio information, and multimedia.

Still further in accordance with a preferred embodiment of the present invention the data includes on-demand data.

Additionally in accordance with a preferred embodiment of the present invention each one of the plurality of service-levels includes an indication of at least one of the following a data transmission bandwidth, a number of users that may concurrently connect to the transmission service, a set of transmission applications served, a type of downgrade support to a service-level lower in the QOS hierarchy, a type of disconnect-on-idle operation, and a determination of a Web server to connect to.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
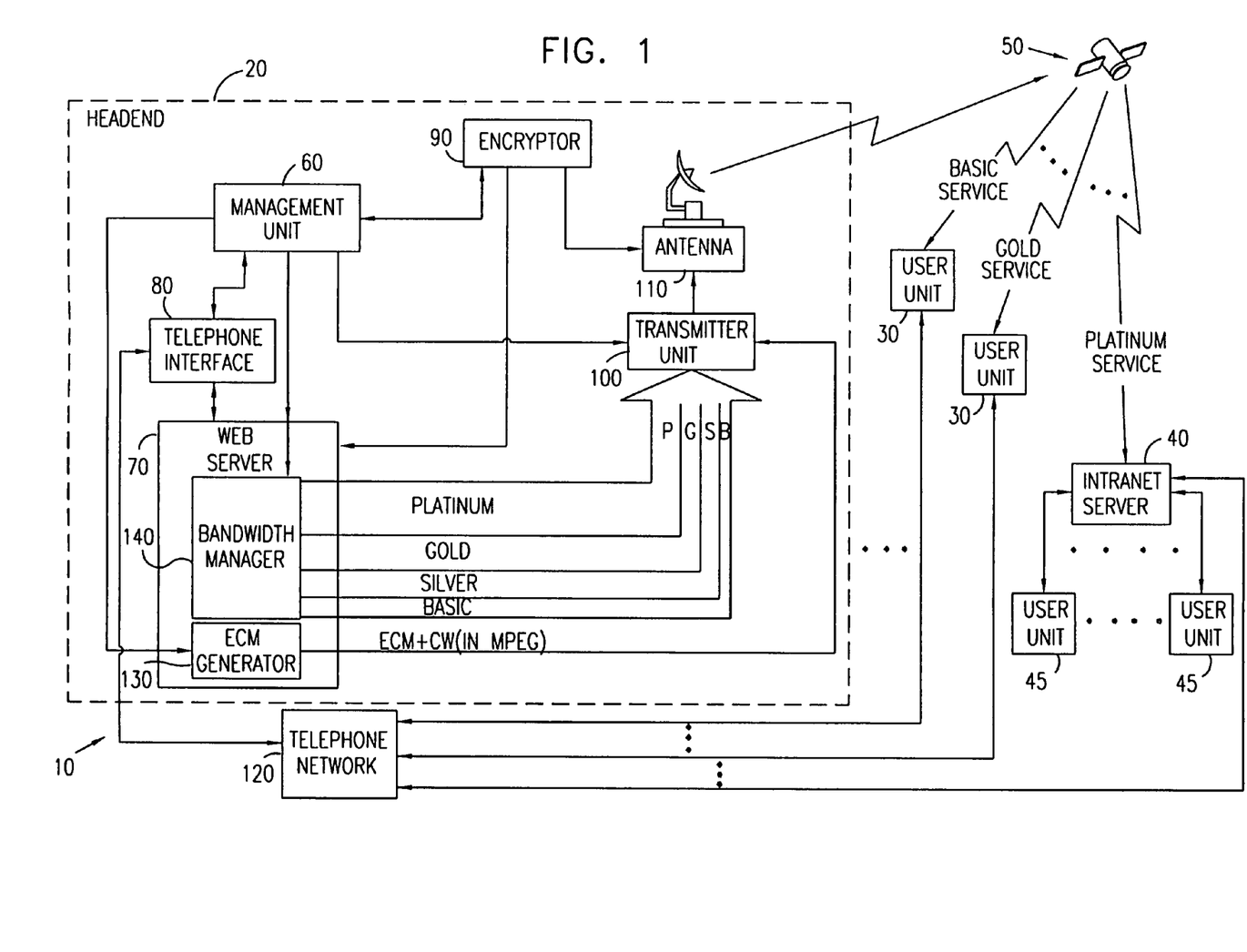
FIG. 1 is a simplified partly pictorial partly block diagram illustration of a communication system constructed and operative in accordance with a preferred embodiment of the present invention.

Reference is now made to FIG. 1, which is a simplified block diagram illustration of a preferred implementation of a satellite communication system 10, constructed and operative in accordance with a preferred embodiment of the present invention.

In the present specification, the example of a satellite communication system is used as a preferred example, it being appreciated that persons skilled in the art may modify the preferred example to use any other appropriate non-satellite communications medium. Examples of possible non-satellite communications media include cable, digital terrestrial, fiber optic, and any other appropriate media.

Preferably, the satellite communication system 10 includes a headend 20 that communicates with a multiplicity of user units 30 and communication servers 40 via a satellite 50. The communication servers 40 may include, for example, conventional Intranet servers that communicate with a plurality of Intranet users 45, conventional Internet servers, or portals as is well known in the art. For purposes of simplicity of description, the plurality of the communication servers 40 is shown in FIG. 1 as one intranet server 40, it being appreciated that a plurality of the communication servers 40 of appropriate types may be used. It is appreciated that communication between the headend 20 and the multiplicity of user units 30 and communication servers 40 may preferably include at least one type of data. The term "data" is used throughout the specification and claims to include any type of analog or digital data, such as, but not limited to, the following: any type of computerized data; video information; audio information; and multimedia.

The communication of video information may include, for example, video-on-demand, and the communication of audio information may include, for example, audio-on-demand. The present invention is not limited to on-demand communication of information, but it is believed that the present invention, in a preferred embodiment thereof, is particularly suited to use with on-demand communication of information.

The headend 20 preferably includes the following units: a management unit 60; a World-Wide-Web (Web) server 70; a telephone interface 80; an encryptor 90; a transmitter unit 100; and an antenna 110.

The transmitter unit 100 is preferably operatively associated with the following units: the Web server 70; the management unit 60; the encryptor 90; and the antenna 110. Preferably, the transmitter unit 100 is operative to inject information signals to the antenna 110 for transmission of information to the user units 30 and the servers 40 via the satellite 50. It is appreciated that the transmitter unit 100 may include all necessary circuitry (not shown) for converting data received from any one of the Web server 70, the management unit 60, and the encryptor 90 to signals suitable for transmission by the antenna 110.

The telephone interface 80 is preferably used for enabling a return communication path so that the user units 30 and the servers 40 may transmit information and requests to the headend 20 by telephone via a telephone network 120 which is operatively associated with the telephone interface 80. However, it is appreciated that the return communication path may be provided via other communication media, such as coaxial cable or satellite, in which case the means for providing the return path may include a cable modem or a very small aperture terminal (VSAT) respectively, or other appropriate communications apparatus, as is well known in the art.

Preferably, the Web server 70 is operatively associated with the telephone interface 80, the management unit 60, and the transmitter unit 100. The Web server 70 preferably includes an entitlement control message (ECM) generator 130 whose operation is preferably controlled by the management unit 60. The ECM generator 130 is preferably operative to generate ECMs from which control words (CWs) for decrypting encrypted data may be derived as is well known in the art. The ECMs are preferably provided to the transmitter unit 100 for transmission thereby to the users 30 and 45. Preferably, the ECMs are transmitted in an MPEG format, as is well known in the art; it is appreciated that any other appropriate format may be used.

The Web server 70 also preferably includes a bandwidth manager 140. The bandwidth manager 140 is preferably operative to allocate different bandwidths for different service-levels supported by the communication system 10. The bandwidth manager 140 is also preferably controlled by the management unit 60 that is operative to assign designated Internet Protocol (IP) addresses to selected data, and these addresses are associated with the appropriate service-levels. Preferably, the data in each service-level is transmitted in an IP format.

In FIG. 1, four service-levels are shown, only by way of example. The four service-levels are referred to as platinum, gold, silver and basic with the platinum service being the highest in a quality-of-service (QOS) hierarchy and the basic service being the lowest in the QOS hierarchy: The platinum service provides transmission at a bandwidth of, for example, 4 Mbits/s. The gold service provides transmission at, for example, a bandwidth of 2 Mbits/s. The silver service provides transmission at, for example, a bandwidth of 1 Mbits/s. The basic service provides transmission at, for example, a bandwidth of 0.5 Mbits/s. The specific bandwidths mentioned above are provided by way of an extremely specific example only, it being appreciated that a different number of service-levels and different transmission bandwidths within the service-levels may be alternatively provided.

The data and ECMs provided by the Web server 70 to the transmitter unit 100 are preferably encrypted by the encryptor 90, where the encryptor 90 is operative to apply appropriate conventional encryption algorithms to the data and the ECMs. The encryptor 90 preferably encrypts the data for QOS according to the designated IP addresses provided by the management unit 60 by using an encryption key uniquely associated with a service-level. Such an encryption key of a service-level is hereinafter termed a "service-level encryption key".

Figure 2:
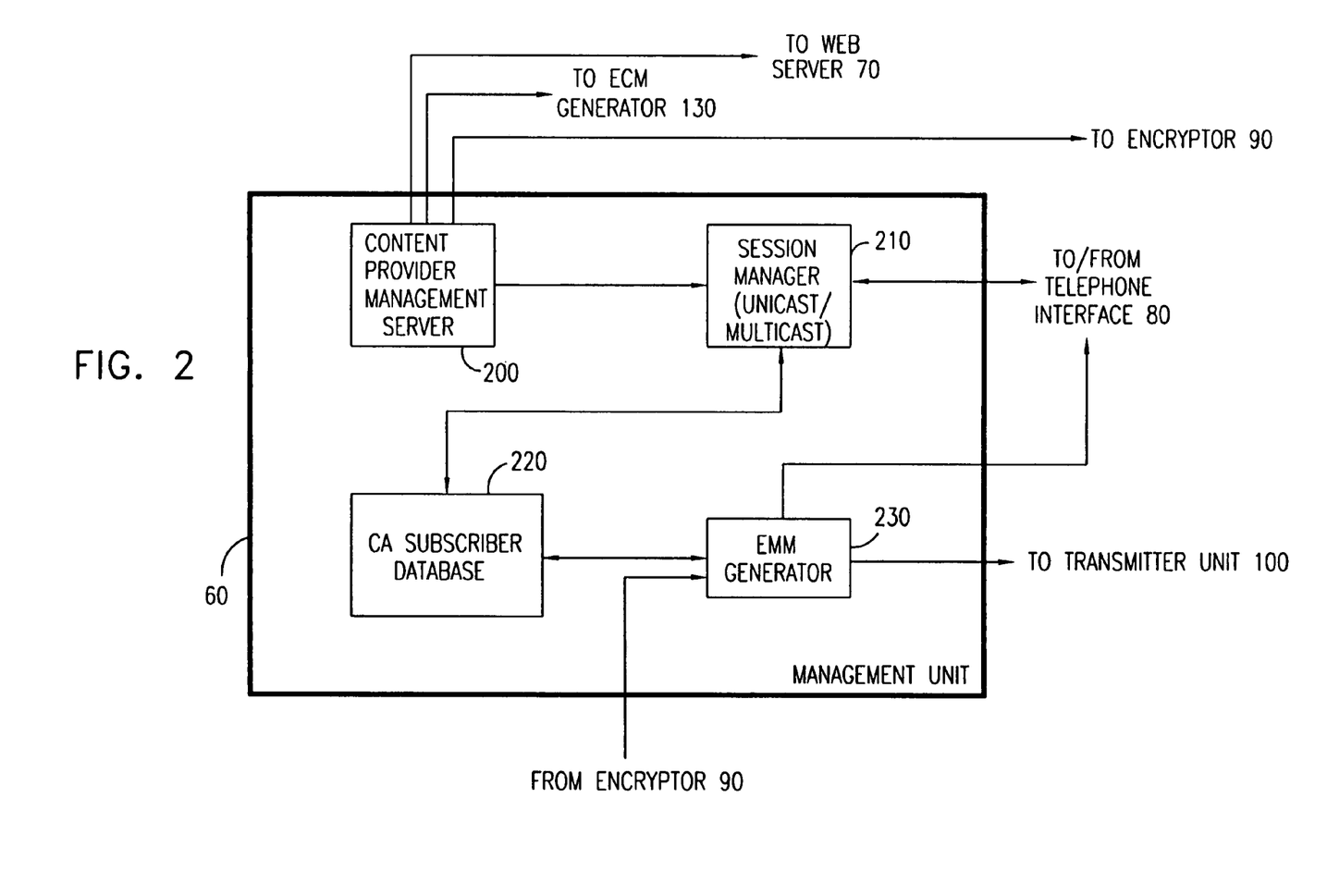
FIG. 2 is a simplified block diagram illustration of a preferred implementation of a management unit in the communication system of FIG. 1.

Reference is now made to FIG. 2 which is a simplified block diagram illustration of a preferred implementation of the management unit 60 in the communication system 10 of FIG. 1.

The management unit 60 preferably includes the following units: a content provider management server 200; a session manager 210; a conditional access (CA) subscriber database 220; and an entitlement management message (EMM) generator 230.

Preferably, the CA subscriber database 220 is operatively associated with the session manager 210 and the EMM generator 230 and is operative to communicate in two-way communication with each of the session manager 210 and the EMM generator 230.

The content provider management server 200 is preferably operatively associated with the session manager 210 and the Web server 70 (FIG. 1) and is operative to provide information to each of the session manager 210 and the Web server 70. Preferably, the content provider management server 200 is also operative to provide information that is used for generating ECMs to the ECM generator 130 (FIG. 1). Additionally, the content provider management server 200 may be also operative to control operation of the encryptor 90 (FIG. 1) for encrypting data with various keys and/or for selecting encryption algorithms by which the data is encrypted.

The EMM generator 230 is preferably operative to provide EMMs that are encrypted by the encryptor 90 (FIG. 1) to the transmitter unit 100 (FIG. 1) or the telephone interface 80 (FIG. 1). The session manager 210 is preferably operatively associated with the user units 30 (FIG. 1) and the servers 40 (FIG. 1) via the telephone interface 80 (FIG. 1) so as to determine whether the users 30 and the servers 40 are currently connected to the system 10 (FIG. 1).

The operation of the system 10 of FIG. 1, with reference to the preferred implementation of FIG. 2, is now briefly described. Preferably, users, such as users using the user units 30 or 45, transmit requests for initiation of sessions and for changes in sessions to the session manager 210 at the headend 20. The requests of the users typically include URLs, as is well known in the art. Also, the requests of the users are preferably associated with IP addresses of the users and service identification corresponding to the users. The term service identification or "service ID" refers to a conventional service identification such as, for example, the conventional service identification as defined in the above-mentioned publication "Digital Video Broadcasting (DVB); DVB specification for data broadcasting".

Preferably, the requests of the users are transmitted to the session manager 210 via the telephone network 120 and the telephone interface 80. The session manager 210 preferably constantly maintains a record of all the user units 30 the servers 40 that are currently connected to the system 10 and monitors sessions including initiation of the sessions and termination of the sessions.

Preferably, upon initiation of sessions or change of sessions, the session manager 210 entitles each of the user units 30 and the servers 40 that initiate a session or make a change in a session to one of a plurality of service-levels. Entitlement to the service-levels is preferably based upon service entitlement information provided by the CA subscriber database 220 to the session manager 210. Preferably, the service entitlement information includes at least the following: IP (Internet Protocol) and MAC (Media Access Control) addresses; service identification; and parameters that define service quality. It is appreciated that the CA subscriber database 220 may transmit the service entitlement information to the bandwidth manager 140 and the ECM generator 130 in the Web server 70, and the session manager 210 may transmit the service entitlement information to the users via the telephone interface 80 and the telephone network 120.

Preferably, the session manager 210 entitles each of the user units 30 and the servers 40 to one of a plurality of service-levels by assigning appropriate IP and MAC addresses to the user units 30 and the servers 40. The session manager 210 also preferably transmits the service entitlement information to the user units 30 and to the servers 40 via the telephone interface 80.

The users who subscribe to communication services provided by the headend 20 may be users of the user units 30 who subscribe, for example, to the Internet, or users of the user units 45 that subscribe, for example, to an Intranet. The communication services typically include unicast transmissions in which data is individually addressed to users, and/or multicast transmissions in which data is addressed to a group of users. However, for simplicity the description below refers to unicast service communication sessions only. It is appreciated that the present invention is not limited by the type of communication sessions communicated in the communication system 10.

The service entitlement information provided by the CA subscriber database 220 typically refers to one of the plurality of service-levels to which a user subscribed. Typically, the plurality of service-levels are hierarchical within a quality-of-service (QOS) hierarchy, and each service-level is preferably associated with a QOS which is determined by at least one parameter that defines service quality. It is appreciated that parameters that define service quality may include, for example, a data transmission bandwidth, a number of users that may concurrently connect to the service, a set of transmission applications served, a type of downgrade support to a service-level lower in the QOS hierarchy, a type of disconnect-on-idle operation, a determination of a Web server to connect to, or a suitable combination thereof.

The parameter of data transmission bandwidth preferably determines a bandwidth at which data transmission is conducted and is typically accepted as a key attribute in QOS measurement. The parameter of number of users that may concurrently connect to the service may be used, for example, to assure 100% connectivity at any time to subscribers subscribed to a service-level that is the highest in the QOS hierarchy by limiting the total number of subscribers that may concurrently connect to the service.

The parameter defining the set of transmission applications served preferably includes applications that are provided only in service-levels that are high in the QOS hierarchy, such as transmission of real video/audio, Usenet and Telnet.

Preferably, downgrade to a service-level that is lower in the QOS hierarchy may be supported in one of an automatic mode and a mode in which downgrade is made upon confirmation of a user. Alternatively, downgrade to a service-level that is lower in the QOS hierarchy may be disabled at one or at several service-levels.

Referring, for example and without limiting the generality of the present invention, to the four service-levels shown in FIG. 1, downgrading may be enabled in a cascaded form from the service-level being the highest in the QOS hierarchy, that is the platinum service, to the service-level being the lowest in the QOS hierarchy, that is the basic service.

In the automatic mode, downgrading from the platinum service to the gold service may be automatically performed when communication load at the platinum service exceeds a predetermined threshold and provided the gold service is available. Similarly, downgrading from the gold service to the silver service may be automatically performed when communication load at the gold service exceeds a predetermined threshold and provided the silver service is available, and the same applies for downgrading from the silver service to the basic service.

In the mode in which downgrade is made upon confirmation a user, the user may be notified that he may choose a downgrade to a service-level that is lower in the QOS hierarchy or wait until the service-level to which he subscribed is available. If the user confirms that he accepts the offer of downgrading to a lower service-level, the downgrade to the lower service-level may be performed and the user may communicate at the lower service-level.

It is appreciated that the basic service cannot be downgraded to another service-level. Furthermore, in the mode in which downgrade is not enabled, downgrade support to a service-level lower in the QOS hierarchy may be also prevented in the platinum service, the gold service and the silver service depending, for example, on constraints at the headend 20.

The parameter defining the type of disconnect-on-idle operation may be selected at all service-levels to allow one of disablement of disconnect-on-idle and disconnect-on-idle after a pre-selected idle time period. Alternatively, the parameter defining the type of disconnect-on-idle operation may be associated with a service-level such that, for example, at the platinum service disconnect-on-idle is disabled, at the gold service disconnect-on-idle is enabled after a long idle period, such as an hour, and at the basic service disconnect-on-idle is enabled after a short idle period, such as 5 minutes.

The parameter defining a Web server to connect to enables users subscribed to the platinum service access to Web servers with large proxies, high speed CPUs and fast Internet connections. It is appreciated that users subscribed to the gold service may be connected to other Web servers having level resources that are lower than the level resource of the Web servers of the platinum service. Thus, it is appreciated that the parameter defining a Web server to connect to may define service-levels in the return path. Additionally, the service-levels in the return path may be defined according to the communication media used for the return path, or the means for providing the return path that are used by the users.

Preferably, for Intranet users transmission services are typically assigned based on a corporation to which the users belong. Each transmission service is addressed to a separate corporation, and a Webmaster of the corporation may select and determine which service-level to provide to a user based on a price that he is willing to pay to a transmission service provider. For Internet users transmission services are typically assigned based on a service-level that a user is willing to pay to a transmission service provider. Typically, the platinum service is the most expensive service-level and provides the highest QOS.

The platinum service preferably assures 100% connectivity at any time at a specific minimum bandwidth. This is preferably achieved by the session manager 210 rejecting connection of users at other service-levels at times when bandwidth is limited due to communication load. Thus, users subscribed to the platinum service have the highest priority of connection to the communication system 10, and other users may be connected at other service-levels once all the users entitled to the platinum service receive the platinum service. It is appreciated that connection at the other service-levels is preferably enabled based on usage criteria so that each user connected at a non-platinum service-level is assured at least the minimal conditions of the non-platinum service-level.

Preferably, once the user units 30 and the servers 40 are entitled by the session manager 210 to receive the transmission services, pieces of data or data streams provided in each service-level are encrypted for QOS with a corresponding service-level encryption key. Each service-level encryption key may preferably be comprised in an ECM generated by the ECM generator 130. Thus, for example, in the four service-levels system of FIG. 1, the service-level encryption key of the platinum service is comprised in ECM1, the service-level encryption key of the gold service is comprised in ECM2, the service-level encryption key of the silver service is comprised in ECM3, and the service-level encryption key of the basic service is comprised in ECM4. It is however appreciated that the basic service may be provided unencrypted with a service-level key.

Figure 3:
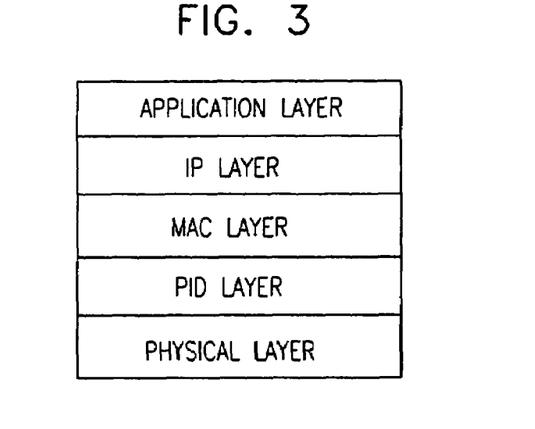
FIG. 3 is a simplified block diagram illustration of communication layers provided in the system of FIG. 1.

Reference is now additionally made to FIG. 3, which is a simplified pictorial illustration of communication layers that may be provided in the system of FIG. 1. In the conventional model of network protocol layers that is shown in FIG. 3, the encryption for QOS is preferably performed in the PID (Packet Identification) layer. The service ID corresponds to the PID, and thus determines a service represented by the PID and having a specific QOS. It is appreciated that additional encryption may be provided within each service-level by encrypting at the MAC layer as described in the above-mentioned unpublished Israel patent application 129, 230, or at the IP layer.

Referring now back to FIG. 1, the pieces of data or the data streams provided in a service-level that is encrypted for QOS with an associated service-level encryption key preferably form encrypted data that is uniquely associated with the service-level. The encrypted data that is uniquely associated with the service-level is then preferably transmitted to users entitled to the service-level. Preferably, decryption key derivation information for deriving a decryption key for decrypting the encrypted data that is uniquely associated with the service-level, that is a corresponding ECM, is also transmitted to the users entitled to the service-level together with the encrypted data. The users entitled to the service-level may then obtain the service-level decryption key from the decryption key derivation information and use the service-level decryption key to decrypt the encrypted data and conduct the communication session in accordance with their entitlements.

Preferably, the users may obtain the service-level decryption key by using, for example, a removable security element, such as a smart card (not shown). A processor (not shown) embedded in the smart card may preferably decrypt an encrypted service-level encryption key provided in an ECM associated with the encrypted data based on authorizations provided in an EMM generated by the EMM generator 230 and transmitted separately. The EMM may include the service entitlement information that is provided by the CA subscriber database 220 and associated users' identification. It is appreciated that EMMs may be encrypted by the encryptor 90 and transmitted constantly to the users by the transmitter unit 100.

It is appreciated that within a service-level, users may read each other's communication content. However, users subscribed to a first service-level cannot read communication content of users subscribed to a second service-level, and vice versa. Thus, the service-level encryption protects a QOS and not a downloaded content.

Preferably, when a user first subscribes to a transmission service provided by the communication system 10, the user receives an EMM from the EMM generator 230 triggered by the CA subscriber database 220 to authorize his subscription. Preferably, upon first subscription, the user selects a service-level at which he intends to perform a communication session. The user may then start a login process at a user unit 30 that is operated by him.

In the login process, the user unit 30 communicates with the headend 20 by telephone via the telephone network 120. The login process may use, for example, a transmission control protocol (TCP) for communicating with the headend 20. Preferably, in response to the login process, the user may supply an identification code, such as a user's smart card identification that uniquely identifies the user, to the session manager 210. The session manager 210 may then query the CA subscriber database 220 to receive subscription information corresponding to the user. The subscription information corresponding to the user may be inserted in the CA subscriber database 220, for example, by an operator at the headend 20 in response to payment information, such as credit card number, provided by the user. Once subscription information corresponding to the user is present in the CA subscriber database 220, the user may receive his entitlements and use the transmission service.

It is appreciated that the transmission service may include a plurality of unicast services, and many users may be entitled to each unicast service. Thus, each unicast service may have multiple pairs of broadcast IP and MAC addresses associated with it and each IP/MAC address pair preferably represents a single user connection for receiving a corresponding unicast service. Preferably, the MAC addresses may be pre-installed at the headend 20 in order to be consistent with common unicast protocols such as DHPC and BOOTP. The IP addresses may preferably be assigned to the users by the session manager 210 during communication sessions.

Typically, the number of IP/MAC pairs determines a number of subscribers that may connect concurrently to the transmission service. In general, the more expensive a unicast service is, the fewer the number of subscribers who are allowed to concurrently connect to the service in order to maximize an available bandwidth for each connected subscriber. Therefore, a unicast service provided only at a service-level that is high in the QOS hierarchy has only few IP/MAC address pairs associated with it. Accordingly, a bandwidth allocated to a subscriber subscribing to a service-level that is high in the QOS hierarchy, such as the platinum service, is typically greater than a bandwidth allocated to a subscriber subscribing to a service-level that is low in the QOS hierarchy, such as the basic service.

Preferably, prior to making unicast service sessions available to the subscribers, the session manager 210 is preferably loaded by the content provider management server 200 with all IP/MAC address pairs available for each unicast service. The session manager 210 then sorts the unicast services for which the user, being one of the subscribers, is authorized. Then, the session manager 210 preferably looks for the highest service-level in the QOS hierarchy for which the user subscribed that is currently available and searches an IP/MAC address table for an available IP/MAC address pair associated with the highest service-level in the QOS hierarchy as well as for all QOS parameters associated with a corresponding unicast service.

If an IP/MAC address pair is available, the session manager 210 selects the available address pair and assigns it to the user, marks it unavailable to other subscribers, and transmits information identifying the selected address pair to the user unit 30, preferably via the telephone interface 80 and the telephone network 120. Then, the selected address pair is assigned to the transmitter unit 100 for the entire unicast session.

Preferably, the session manager 210 provides the selected address pair to the transmitter unit 100 which is operative to assign the address pair to the user unit 30 by using a conventional protocol, such as DHCP or BOOTP. The unicast MAC address is preferably used to set a filter on the transmitter unit 100, and a service information (SI) stream service ID is preferably mapped to the PID. The SI stream service ID may preferably be used to identify where to locate a specific data stream in a digital video broadcast (DVB) transport stream. The PID is also preferably used to set the filter on the transmitter unit 100 for the duration of the entire unicast session.

It is appreciated that the session manager 210 may also assign additional QOS parameters that typically vary in time in order to allow proper maintenance and termination of unicast sessions. Examples of such QOS parameters include port numbers and heartbeat management attributes.

Preferably, if an IP/MAC address pair is not available, the session manager 210 may perform downgrading according to a type of downgrade supported at the unicast session as mentioned above.

Once an IP/MAC address pair and unicast session is assigned to the user, the user may query the Web server 70 associated with the unicast session and decrypt content of the session using, as mentioned above, the smart card. It is appreciated that if the user tries to query a Web server for data on a service or service-level to which he is not entitled, the user will not be able to decrypt the data.

Figure 4:
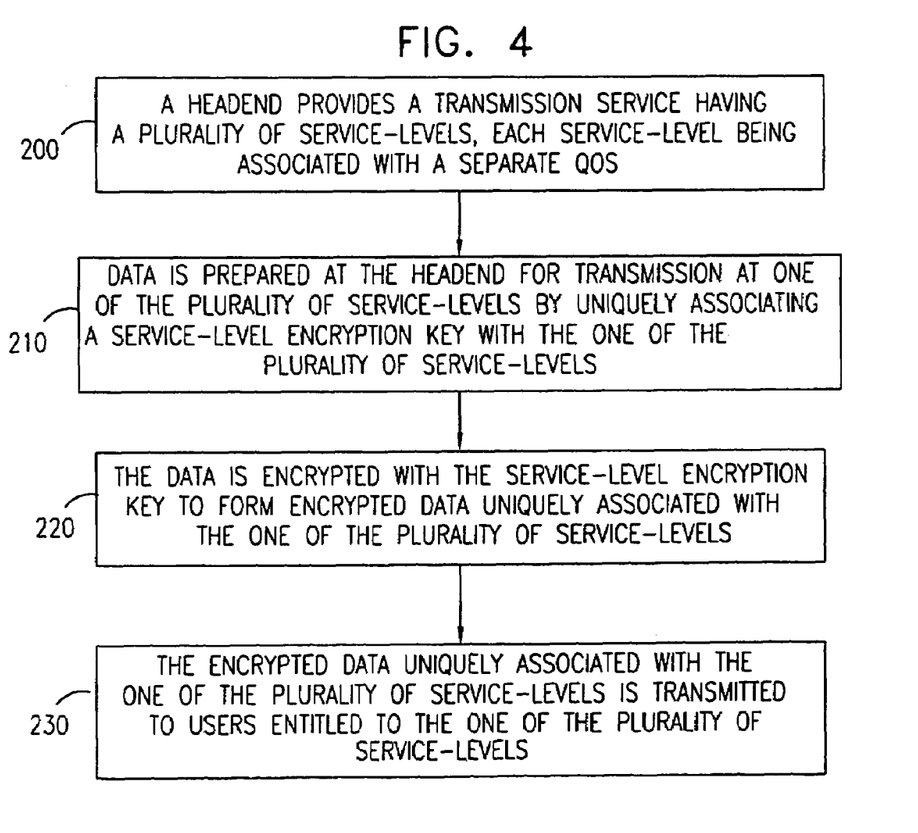
FIG. 4 is a simplified flow chart illustration of a preferred method of operation of the system of FIG. 1.

Reference is now made to FIG. 4 which is a simplified flow chart illustration of a preferred method of operation of the satellite communication system 10 of FIG. 1. The method of FIG. 4 preferably includes the following steps:

Preferably, a headend provides a transmission service having a plurality of service-levels, each service-level being associated with a separate QOS (step 200). At the headend, data may be prepared for transmission at one of the plurality of service-levels by uniquely associating a service-level encryption key with the one of the plurality of service-levels (step 210). Then, the data may be encrypted with the service-level encryption key to form encrypted data uniquely associated with the one of the plurality of service-levels (step 220). The encrypted data uniquely associated with the one of the plurality of service-levels is then transmitted to users entitled to the one of the plurality of service-levels (step 230).

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. A communication session management method for providing a transmission service having a plurality of service-levels, each service-level being associated with a separate quality-of-service (QOS), the method comprising:
    preparing data for transmission at one of the plurality of service-levels by uniquely associating a service-level encryption key with said one of the plurality of service-levels;
    encrypting said data with said service-level encryption key to form encrypted data uniquely associated with said one of the plurality of service-levels;
    transmitting said encrypted data uniquely associated with said one of the plurality of service-levels to users entitled to said one of the plurality of service-levels;
    determining that communication load at said one of the plurality of service-levels exceeds a threshold;
    in response to a result of the determining step, downgrading to an available service-level that is lower in the QOS hierarchy than said one of the plurality of service-levels; and
    distributing to the users entitled to said one of the plurality of service-levels decryption key derivation information for decrypting said encrypted data,
    wherein said decryption key derivation information is comprised in an entitlement control message (ECM) and said downgrading step is supported in one of the following modes: an automatic mode; and a mode in which downgrade is made upon confirmation by a user.

2. A method according to claim 1 and wherein said plurality of service-levels are hierarchical according to a QOS hierarchy.

3. A method according to claim 2 and wherein each one of the plurality of service-levels includes an indication of at least one of the following: a data transmission bandwidth; a number of users that may concurrently connect to the transmission service; a set of transmission applications served; a type of downgrade support to a service-level lower in the QOS hierarchy; a type of disconnect-on-idle operation; and a determination of a Web server to connect to.

4. A method according to claim 1 and wherein said downgrading step comprises:
    identifying the available service-level that is lower in the QOS hierarchy than said one of the plurality of service-levels;
    encrypting said data with an encryption key uniquely associated with said available service-level that is lower in the QOS hierarchy than said one of the plurality of service-levels to form encrypted data uniquely associated with said service-level that is lower in the QOS hierarchy; and
    transmitting said encrypted data uniquely associated with said service-level that is lower in the QOS hierarchy to users entitled to said one of the plurality of service-levels.

5. A method according to claim 1 and wherein the transmission service comprises at least one of the following: a unicast transmission; and a multicast transmission.

6. A method according to claim 1 and wherein said users comprise at least one of the following: individual users; and users of an Intranet.

7. A method according to claim 1 and wherein said encrypting step is performed in a PID layer.

8. A method according to claim 1 and also comprising the step of enabling the users entitled to said one of the plurality of service-levels to decrypt said encrypted data according to service-level entitlements of the users.

9. A method according to claim 1 and wherein said data comprises at least one of the following: any type of computerized data; video information; audio information; and multimedia.

10. A method according to claim 9 and wherein said data comprises on-demand data.

11. The method according to claim 1 and wherein the user is given a choice between:
   downgrading to a service-level that is lower in the QOS hierarchy; and
   waiting until the service level to which the user is subscribed is available.

12. A method according to claim 1 and wherein said downgrading step is supported in a mode in which downgrade is made upon confirmation by the user.

13. A system at a headend for providing a transmission service having a plurality of service-levels, each service-level being associated with a separate quality-of-service (QOS), the system comprising:
   a management unit for preparing data for transmission at one of the plurality of service-levels by uniquely associating a service-level encryption key with said one of the plurality of service-levels;
   an encryptor operatively associated with said management unit and operative to encrypt said data with said service-level encryption key to form encrypted data uniquely associated with said one of the plurality of service-levels; and
   a transmitter unit operatively associated with said management unit and said encryptor and operative to transmit said encrypted data uniquely associated with said one of the plurality of service-levels to users entitled to said one of the plurality of service-levels,
   wherein the management unit is operative to:
      determine that communication load at said one of the plurality of service-levels exceeds a threshold;
      in response to a determination that communication load at said one of the plurality of service-levels exceeds the threshold, downgrade to an available service-level that is lower in the QOS hierarchy than said one of the plurality of service-levels; and
      distribute to the users entitled to said one of the plurality of service-levels decryption key derivation information for decrypting said encrypted data,
      wherein said decryption key derivation information is comprised in an entitlement control message (ECM) and said downgrade is supported in one of the following modes: an automatic mode; and a mode in which downgrade is made upon confirmation by a user.

14. A system according to claim 13 and wherein said data comprises at least one of the following: any type of computerized data; video information; audio information; and multimedia.

15. A system according to claim 14 and wherein said data comprises on-demand data.

16. A system according to claim 13 and wherein each one of the plurality of service-levels includes an indication of at least one of the following: a data transmission bandwidth; a number of users that may concurrently connect to the transmission service; a set of transmission applications served; a type of downgrade support to a service-level lower in the QOS hierarchy; a type of disconnect-on-idle operation; and a determination of a Web server to connect to.

17. A system according to claim 13 and wherein said downgrade is made upon confirmation by the user.

18. A communication session management method for providing a transmission service having a plurality of service-levels, each service-level being associated with a separate quality-of-service (QOS), the method comprising:
   preparing data for transmission at one of the plurality of service-levels by uniquely associating a service-level encryption key with said one of the plurality of service-levels;
   encrypting said data with said service-level encryption key to form encrypted data uniquely associated with said one of the plurality of service-levels; and
   transmitting said encrypted data uniquely associated with said one of the plurality of service-levels to users entitled to said one of the plurality of service-levels,
   wherein said plurality of service-levels are hierarchical according to a QOS hierarchy, and
   each one of the plurality of service-levels includes an indication of a type of downgrade support to a service-level lower in the QOS hierarchy.

19. A communication session management method for providing a transmission service having a plurality of service-levels, each service-level being associated with a separate quality-of-service (QOS), the method comprising:
   preparing data for transmission at one of the plurality of service-levels by uniquely associating a service-level encryption key with said one of the plurality of service-levels;
   encrypting said data with said service-level encryption key to form encrypted data uniquely associated with said one of the plurality of service-levels; and
   transmitting said encrypted data uniquely associated with said one of the plurality of service-levels to users entitled to said one of the plurality of service-levels,
   wherein said plurality of service-levels are hierarchical according to a QOS hierarchy, and
   each one of the plurality of service-levels includes an indication of a type of disconnect-on-idle operation.

* * * * *